United States Patent
Shibaoka et al.

(10) Patent No.: US 12,257,882 B2
(45) Date of Patent: Mar. 25, 2025

(54) AIR CONDITIONING DEVICE FOR VEHICLE

(71) Applicant: SANDEN CORPORATION, Gunma (JP)

(72) Inventors: Yoshiki Shibaoka, Gunma (JP);
Kouhei Yamashita, Gunma (JP);
Hongming Zhang, Gunma (JP);
Yoshiyuki Okamoto, Gunma (JP);
Takayuki Matsumura, Gunma (JP);
Kodai Matsuzaki, Gunma (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 18/044,013

(22) PCT Filed: Aug. 26, 2021

(86) PCT No.: PCT/JP2021/031287
§ 371 (c)(1),
(2) Date: Mar. 3, 2023

(87) PCT Pub. No.: WO2022/064946
PCT Pub. Date: Mar. 31, 2022

(65) Prior Publication Data
US 2024/0278619 A1 Aug. 22, 2024

(30) Foreign Application Priority Data

Sep. 24, 2020 (JP) .................................. 2020-160097

(51) Int. Cl.
B60H 1/00 (2006.01)
(52) U.S. Cl.
CPC .............................. B60H 1/00907 (2013.01)

(58) Field of Classification Search
CPC ............ B60H 1/00278; B60H 1/00921; B60H 1/00928; B60H 1/00899; B60H 1/32284; B60L 2240/662; B60L 2240/36
See application file for complete search history.

(56) References Cited

U.S. PATENT DOCUMENTS

| 5,518,176 A * | 5/1996 | Turner ............... B60H 1/00742 236/91 C |
| 2010/0326127 A1* | 12/2010 | Oomura ............... B60H 1/3208 62/498 |

(Continued)

FOREIGN PATENT DOCUMENTS

| JP | 2014-213765 A | 11/2014 |
| JP | 2020-050155 A | 4/2020 |

(Continued)

OTHER PUBLICATIONS

International Search Report mailed on Nov. 9, 2021 for PCT/JP2021/031287.

*Primary Examiner* — Nelson J Nieves
*Assistant Examiner* — Meraj A Shaikh
(74) *Attorney, Agent, or Firm* — Rankin, Hill & Clark LLP

(57) ABSTRACT

A control device of a vehicle air-conditioning apparatus, in a heating operation by use of a heating unit, has at least a temperature control target heat absorption heating mode in which a refrigerant that has been discharged from a compressor and has dissipated heat in the heating unit absorbs heat in a temperature control target-specific heat exchanger, and a combined heating mode in which the refrigerant that has been discharged from the compressor and has dissipated heat in the heating unit absorbs heat in an outdoor heat exchanger and the temperature control target-specific heat exchanger, and during the heating operation in the combined heating mode, performs control in such a manner as to (Continued)

determine an operating state that allows the refrigerant to accumulate in the outdoor heat exchanger, and switch to the temperature control target heat absorption heating mode to execute the heating operation.

8 Claims, 5 Drawing Sheets

(56) References Cited

U.S. PATENT DOCUMENTS

| | | | |
|---|---|---|---|
| 2016/0082805 A1* | 3/2016 | Graaf | B60H 1/04 62/238.7 |
| 2016/0121691 A1* | 5/2016 | Liu | B60H 1/00921 62/115 |
| 2016/0185185 A1 | 6/2016 | Suzuki et al. | |
| 2017/0174038 A1* | 6/2017 | Scheldel | B60H 1/3213 |
| 2020/0171919 A1 | 6/2020 | Ishizeki et al. | |
| 2021/0323380 A1 | 10/2021 | Ishizeki et al. | |

FOREIGN PATENT DOCUMENTS

| | | |
|---|---|---|
| WO | 2019/021710 A1 | 1/2019 |
| WO | 2020/066719 A1 | 4/2020 |

* cited by examiner

AIR CONDITIONING DEVICE FOR VEHICLE

TECHNICAL FIELD

The present invention relates to a heat pump vehicle air-conditioning apparatus, and particularly to a vehicle air-conditioning apparatus capable of heating the interior of a vehicle by absorbing heat from temperature control targets such as a battery and a motor that are mounted on the vehicle.

BACKGROUND ART

In recent years, vehicles such as hybrid vehicles and electric vehicles that drive a motor for traveling with electric power supplied from a battery mounted on the vehicle have become widespread. As an air-conditioning apparatus applied to such vehicles, an air-conditioning apparatus is known which includes a refrigerant circuit in which a compressor that compresses and discharges a refrigerant, a radiator (indoor heat exchanger) that is provided inside the vehicle and causes the refrigerant to dissipate heat, and an outdoor heat exchanger that is provided outside the vehicle to let outside air thereinto and to cause the refrigerant to absorb or dissipate heat are connected (for example, Patent Literature 1). Such a vehicle air-conditioning apparatus, for example, performs heating by causing the refrigerant that has been discharged from the compressor and has dissipated heat in the radiator to absorb heat in the outdoor heat exchanger, and performs cooling by causing the refrigerant that has been discharged from the compressor and has dissipated heat in the outdoor heat exchanger to evaporate in a heat sink (evaporator) to absorb heat, thereby conditioning the air in the vehicle.

Moreover, for example, a vehicle air-conditioning apparatus is known which includes a refrigerant circuit provided with a temperature control target-specific heat exchanger that cools a temperature control target such as a battery and which switches between an outside air heat absorption heating mode in which only an outdoor heat exchanger causes a refrigerant to absorb heat during heating operation, a temperature control target-specific heat exchanger heating mode in which only the temperature control target-specific heat exchanger causes the refrigerant to absorb heat during the heating operation, and a combined heating mode in which both of the outdoor heat exchanger and the temperature control target-specific heat exchanger cause the refrigerant to absorb heat during the heating operation, and executes the mode (for example, Patent Literature 2).

CITATION LIST

Patent Literature

Patent Literature 1: JP-A-2014-213765
Patent Literature 2: JP-A-2020-050155

SUMMARY OF INVENTION

Problems to be Solved by Invention

When the refrigerant is circulated to both of the outdoor heat exchanger and the temperature control target-specific heat exchanger in the combined heating mode of the vehicle air-conditioning apparatus described above, the refrigerant that has been discharged from the compressor and has dissipated heat and been cooled in the radiator is caused to branch into a flow path leading to the outdoor heat exchanger and a flow path leading to the temperature control target-specific heat exchanger. Thereafter, the outdoor heat exchanger and the temperature control target-specific heat exchanger cause the branched flows of the refrigerant to absorb heat, respectively, and the flows of the refrigerant are caused to flow into the compressor again.

In other words, the branched flow of the refrigerant has flowed into the outdoor heat exchanger; therefore, the branched flow of the refrigerant flows out of the outlet of the outdoor heat exchanger. On the other hand, the refrigerant that has been circulated from the outdoor heat exchanger and the refrigerant that has been circulated from the temperature control target-specific heat exchanger merge at the inlet of the compressor and flows into the compressor. Therefore, the amount of the circulating refrigerant at the outlet of the outdoor heat exchanger is different from the amount of the circulating refrigerant at the inlet of the compressor. Moreover, the amount of heat absorption in the outdoor heat exchanger is not necessarily equal to the amount of heat absorption in the temperature control target-specific heat exchanger; therefore, the temperature and pressure of the refrigerant that flows out of the outdoor heat exchangers are not necessarily equal to the temperature and pressure of the refrigerant that flows out of the temperature control target-specific heat exchanger, either.

Due to such a background, the refrigerant (liquid refrigerant or oil) may accumulate in the outdoor heat exchanger during operation in the combined heating mode. If a fixed amount or greater of the refrigerant accumulates in the outdoor heat exchanger, the amount of the refrigerant that circulates in the refrigerant circuit becomes insufficient, which may lead to, for example, a reduction in heating performance, a reduction in durability and failure of the compressor, and false detection of refrigerant shortage.

The present invention has been made considering such circumstances, and an object thereof is, for example, to prevent the accumulation of a refrigerant in an outdoor heat exchanger while making effective use of heat of a temperature control target for heating in a vehicle interior.

Solution to Problems

The present invention provides a vehicle air-conditioning apparatus including: a refrigerant circuit having a compressor configured to compress a refrigerant, a heating unit configured to heat blowing air to be blown into an air-conditioning target space, and an outdoor heat exchanger configured to cause the refrigerant to absorb heat; a device temperature adjustment circuit having a temperature control target-specific heat exchanger configured to adjust the temperature of a temperature control target mounted on a vehicle by use of the refrigerant; and a control device configured to control the refrigerant circuit and the device temperature adjustment circuit, in which the control device, in a heating operation for heating the interior of the vehicle by use of the heating unit, has at least a temperature control target heat absorption heating mode in which the refrigerant that has been discharged from the compressor and has dissipated heat in the heating unit absorbs heat in the temperature control target-specific heat exchanger, and a combined heating mode in which the refrigerant that has been discharged from the compressor and has dissipated heat in the heating unit absorbs heat in the outdoor heat exchanger and the temperature control target-specific heat exchanger, and during the heating operation in the combined heating mode, performs control in such a manner as to determine an operating state that allows the refrigerant to accumulate in the outdoor heat exchanger, and switch to the temperature control target heat absorption heating mode to execute the heating operation.

Effects of Invention

According to the present invention, it is possible to prevent the accumulation of a refrigerant in an outdoor heat exchanger while making effective use of heat of a temperature control target for heating in a vehicle interior.

DESCRIPTION OF EMBODIMENTS

Figure 1:
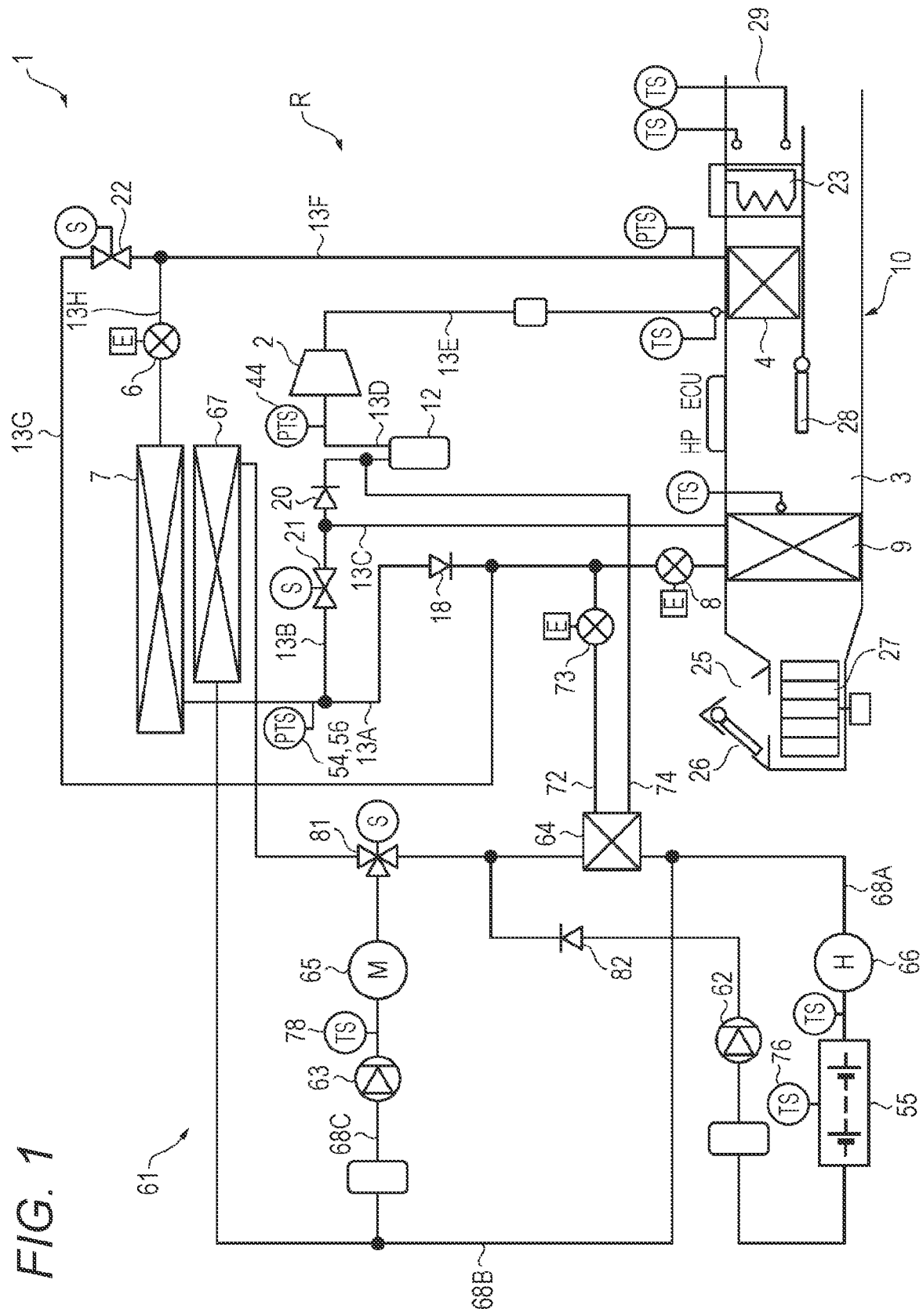
FIG. 1 is a diagram illustrating a schematic configuration of a vehicle air-conditioning apparatus according to an embodiment of the present invention.

A mode for carrying out the present invention is described in detail hereinafter with reference to the drawings. In the following description, the same reference signs denote portions of the same functions, and redundant descriptions in the drawings are omitted as appropriate.

FIG. 1 illustrates a schematic configuration of a vehicle air-conditioning apparatus 1 according to an embodiment of the present invention. The vehicle air-conditioning apparatus 1 can be applied to vehicles such as an electric vehicle (EV) where an engine (internal combustion engine) is not mounted and what is called a hybrid vehicle that uses an engine and an electric motor for traveling. Such a vehicle is mounted with a battery 55 (for example, a lithium battery), and is driven and travels by supplying electric power charged in the battery 55 from an external power source, to a motor unit 65 including a motor for traveling (an electric motor). The vehicle air-conditioning apparatus 1 is also driven by the power supplied from the battery 55.

The vehicle air-conditioning apparatus 1 includes a refrigerant circuit R for performing heat pump operation, and a device temperature adjustment circuit 61 that adjusts the temperatures of temperature control targets such as the battery 55 and the motor unit 65. The device temperature adjustment circuit 61 is a parallel circuit to the refrigerant circuit R via a refrigerant-heating medium heat exchanger 64 described below. The vehicle air-conditioning apparatus 1 selectively executes various operation modes including air-conditioning operation such as heating operation and cooling operation based on the heat pump operation that uses the refrigerant circuit R to condition air in a vehicle and control the temperatures of the temperature control targets such as the battery 55 and the motor unit 65.

The refrigerant circuit R is configured in such a manner that, for example, a motor-driven compressor (electric compressor) 2 that compresses a refrigerant, a radiator 4 as an indoor heat exchanger (heating unit) that is provided in an air circulation path 3 of an HVAC unit 10 through which the vehicle is ventilated and the air in the vehicle interior is circulated, dissipates heat from the high-temperature, high-pressure refrigerant discharged from the compressor 2, and heats the air to be supplied to the vehicle interior, an outdoor expansion valve 6 that decompresses and expands the refrigerant during heating, an outdoor heat exchanger 7 for exchanging heat between the refrigerant and outside air to function as a radiator (condenser) that causes the refrigerant to dissipate heat during cooling and to function as an evaporator that causes the refrigerant to absorb heat during heating, an indoor expansion valve 8 that decompresses and expands the refrigerant, a heat sink 9 provided in the air circulation path 3 to cause the refrigerant to absorb heat from the interior or exterior of the vehicle and then cool the air to be supplied to the vehicle interior during cooling (during dehumidification), and an accumulator 12 are connected by refrigerant pipes 13A to 13H.

An electronic expansion valve can be applied to each of the outdoor expansion valve 6 and the indoor expansion valve 8. The outdoor expansion valve 6 is configured in such a manner as to decompress and expand the refrigerant that flows out of the radiator 4 and flows into the outdoor heat exchanger 7 and also to be capable of being fully closed. The indoor expansion valve 8 decompresses and expands the refrigerant flowing into the heat sink 9, and adjusts the heat absorption capability of the refrigerant, that is, the cooling capacity of the passing air, of the heat sink 9.

A refrigerant outlet of the outdoor heat exchanger 7 and a refrigerant inlet of the heat sink 9 are connected by the refrigerant pipe 13A. The refrigerant pipe 13A is provided with a check valve 18 and the indoor expansion valve 8 sequentially from the outdoor heat exchanger 7. The check valve 18 is provided to the refrigerant pipe 13A in such a manner that a direction pointing to the heat sink 9 is a forward direction. The refrigerant pipe 13A branches to the refrigerant pipe 13B at a position closer to the outdoor heat exchanger 7 than the check valve 18 is.

The refrigerant pipe 13B that branches from the refrigerant pipe 13A is connected to a refrigerant inlet of the accumulator 12. The refrigerant pipe 13B is provided with a solenoid valve 21 and a check valve 20 that are open during heating, sequentially from the outdoor heat exchanger 7. The check valve 20 is connected in such a manner that a direction pointing to the accumulator 12 is a forward direction. The refrigerant pipe 13B branches to the refrigerant pipe 13C at some point between the solenoid valve 21 and the check valve 20. The refrigerant pipe 13C that branches from the refrigerant pipe 13B is connected to a refrigerant outlet of the heat sink 9. A refrigerant outlet of the accumulator 12 and the compressor 2 are connected by the refrigerant pipe 13D.

A refrigerant outlet of the compressor 2 and a refrigerant inlet of the radiator 4 are connected by the refrigerant pipe 13E. One end of the refrigerant pipe 13F is connected to the refrigerant outlet of the radiator 4, and the other end of the refrigerant pipe 13F branches into the refrigerant pipes 13G and 13H before (on a refrigerant upstream side of) the outdoor expansion valve 6. The refrigerant pipe 13H, which is one of the branches, is connected to a refrigerant inlet side of the outdoor heat exchanger 7 via the outdoor expansion valve 6. Moreover, the refrigerant pipe 13G, which is the other branch, is connected between the check valve 18 and the indoor expansion valve 8 of the refrigerant pipe 13A. A solenoid valve 22 is provided on a refrigerant upstream side of the connection point of the refrigerant pipe 13G with the refrigerant pipe 13A.

Consequently, the refrigerant pipe 13G is connected in parallel to a series circuit including the outdoor expansion valve 6, the outdoor heat exchanger 7, and the check valve 18, and serves as a circuit that bypasses the outdoor expansion valve 6, the outdoor heat exchanger 7, and the check valve 18.

In the air circulation path 3 on an air upstream side of the heat sink 9, inlets of an outside air inlet and an inside air inlet are formed (FIG. 1 illustrates an inlet 25 as a representative). The inlet 25 is provided with an intake switching damper 26. The intake switching damper 26 switches between inside air that is the air in the vehicle (inside air recirculation) and outside air that is the air outside the vehicle (outside air introduction) as appropriate to introduce the air into the air circulation path 3 from the inlet 25. An indoor fan (blower fan) 27 for supplying the introduced inside air or outside air to the air circulation path 3 is provided on an air downstream side of the intake switching damper 26.

In FIG. 1, an auxiliary heater 23 is an auxiliary heater as an auxiliary heating device. The auxiliary heater 23 includes, for example, a PTC heater (electric heater), and is provided in the air circulation path 3 on an air downstream side of the radiator 4 relative to the air flow in the air circulation path 3. When the auxiliary heater 23 is energized to generate heat, it serves as what is called a heater core and complements heating in the vehicle.

An air mixing damper 28 that adjusts the ratio of air (inside air or outside air) in the air circulation path 3 that has flowed into the air circulation path 3 and has passed through the heat sink 9 to be let into the radiator 4 and the auxiliary heater 23 is provided in the air circulation path 3 on an air upstream side of the radiator 4.

The device temperature adjustment circuit 61 circulates a heating medium to the temperature control targets such as the battery 55 and the motor unit 65 to adjust the temperatures of the battery 55 and the motor unit 65. Note that the motor unit 65 also includes heat generating devices such as an electric motor for traveling and an inverter circuit that drives an electric motor. In addition to the battery 55 and the motor unit 65, a device that is mounted on the vehicle and generates heat can be applied as the temperature control target.

The device temperature adjustment circuit 61 includes a first circulation pump 62 and a second circulation pump 63 as circulation devices for circulating the heating medium to the battery 55 and the motor unit 65, the refrigerant-heating medium heat exchanger (hereinafter referred to as the "chiller heat exchanger") 64, a heating medium heater 66, an air-heating medium heat exchanger 67, and a three-way valve 81 as a flow path switching device.

The device temperature adjustment circuit 61 is connected to the refrigerant circuit R via the chiller heat exchanger 64. In the refrigerant circuit R, one end of a branch pipe 72 as a branch circuit is connected between the connection point of the refrigerant pipe 13A with the refrigerant pipe 13G and the indoor expansion valve 8, and the other end of the branch pipe 72 is connected to a refrigerant flow path of the chiller heat exchanger 64. The branch pipe 72 is provided with an auxiliary expansion valve 73. The auxiliary expansion valve 73 is configured in such a manner as to decompress and expand the refrigerant flowing into the refrigerant flow path of the chiller heat exchanger 64 and also to be capable of being fully closed.

One end of a refrigerant pipe 74 is connected to an outlet of the refrigerant flow path of the chiller heat exchanger 64, and the other end of the refrigerant pipe 74 is connected between the check valve 20 of the refrigerant pipe 13B and the accumulator 12. The chiller heat exchanger 64 constitutes a part of the refrigerant circuit R and also constitutes a part of the device temperature adjustment circuit 61.

One end of a heating medium pipe 68A is connected to a heating medium discharge side of the chiller heat exchanger 64. The heating medium pipe 68A is provided with the heating medium heater 66, the battery 55, the first circulation pump 62, and a check valve 82 sequentially from the chiller heat exchanger 64. The other end of the heating medium pipe 68A is connected to a heating medium pipe 68B described below. The heating medium pipe 68A branches to the heating medium pipe 68B in a position closer to the chiller heat exchanger 64 than the heating medium heater 66 is. The other end of the branched heating medium pipe 68B is connected to a heating medium inlet of the chiller heat exchanger 64. The heating medium pipe 68B is provided with the air-heating medium heat exchanger 67. The air-heating medium heat exchanger 67 is placed on a leeward side of the outdoor heat exchanger 7 relative to the flow (air course) of outside air (air) to be let in by an unillustrated outdoor fan.

The three-way valve 81 is provided on a heating medium downstream side of the air-heating medium heat exchanger 67 of the heating medium pipe 68B, and the other end of the heating medium pipe 68A is connected between the three-way valve 81 of the heating medium pipe 68B and the heating medium inlet of the chiller heat exchanger 64. The heating medium pipe 68B branches to a heating medium pipe 68C on a heating medium upstream side of the air-heating medium heat exchanger 67 of the heating medium pipe 68B, and the other end of the branched heating medium pipe 68C is connected to the three-way valve 81. The heating medium pipe 68C is provided with the second circulation pump 63 and the motor unit 65.

As the heating medium used in the device temperature adjustment circuit 61, for example, water, a refrigerant such as HFO-1234yf, a liquid such as a coolant, or a gas such as air can be adopted. Note that in the embodiment, water is adopted as the heating medium. Moreover, it is assumed that, for example, a jacket structure in which the heating medium can circulate in heat exchange relationship with the battery 55 and the motor unit 65 is provided around the battery 55 and the motor unit 65.

When the three-way valve 81 is switched to a state of causing the inlet and the outlet closer to the chiller heat exchanger 64 to communicate with each other, and the second circulation pump 63 is operated, the heating medium discharged from the second circulation pump 63 flows through the heating medium pipe 68C, the motor unit 65, the three-way valve 81, the heating medium pipe 68B, a heating medium flow path of the chiller heat exchanger 64, and the heating medium pipe 68B in this order, and is sucked into the second circulation pump 63. In such a flow path controlled state, the heating medium is circulated between the motor unit 65 and the chiller heat exchanger 64.

When the auxiliary expansion valve 73 is open, a part or all of the refrigerant that has flowed out of the refrigerant pipe 13G and the outdoor heat exchanger 7 flows into the branch pipe 72, is decompressed by the auxiliary expansion valve 73, and then flows into the refrigerant flow path of the chiller heat exchanger 64 to evaporate. The refrigerant absorbs heat from the heating medium flowing through the heating medium flow path in the course of flowing through the refrigerant flow path of the chiller heat exchanger 64, and then is sucked into the compressor 2 through the accumulator 12.

Note that in addition to the indoor heat exchanger, the heating unit can also take, for example, a form in which hot water heated by compressor waste heat is circulated to the heater core to heat blowing air.

Figure 2:
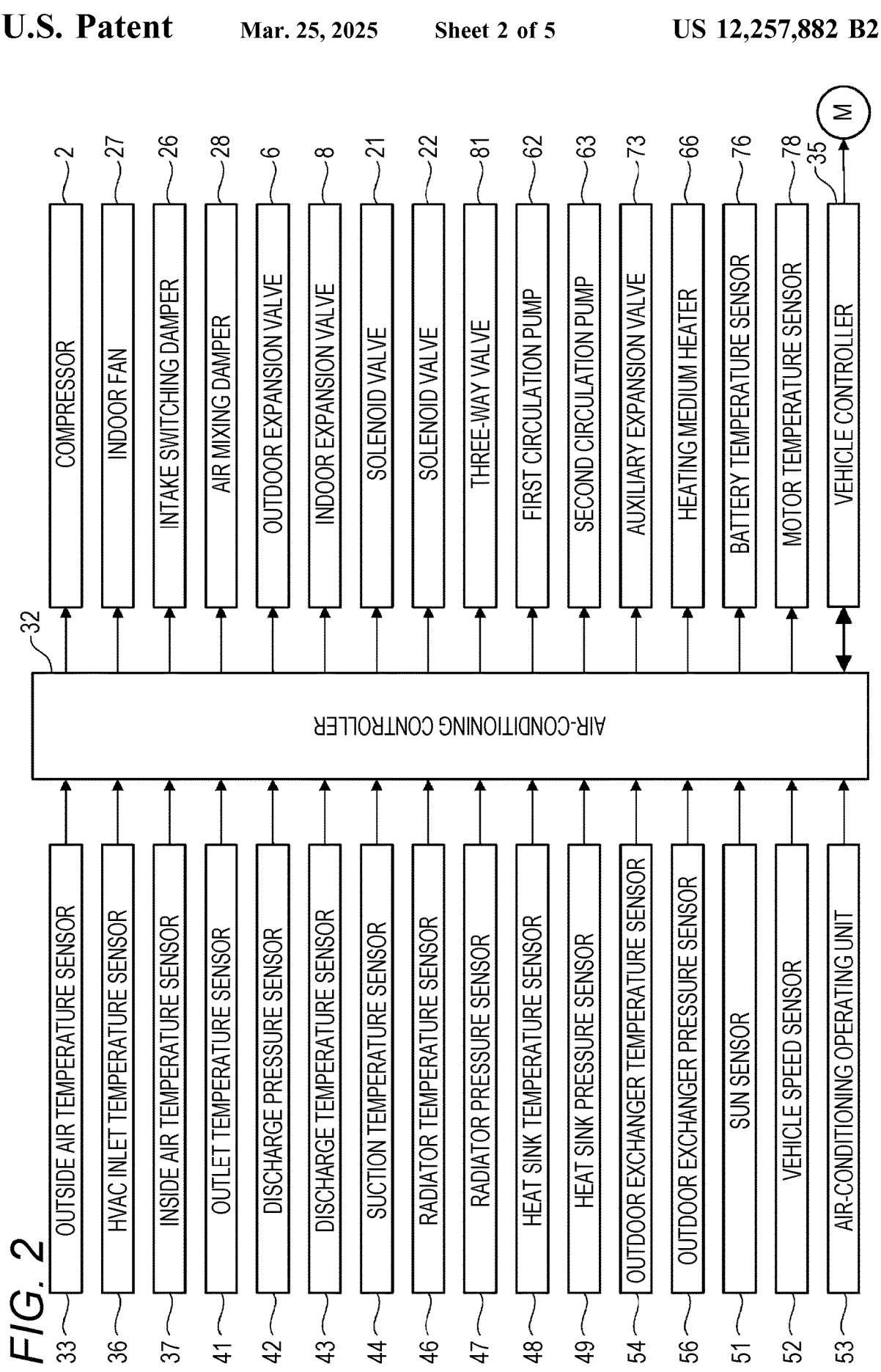
FIG. 2 is a block diagram illustrating a schematic configuration of an air-conditioning controller as a control device of the vehicle air-conditioning apparatus according to the embodiment of the present invention.

FIG. 2 illustrates a schematic configuration of the air-conditioning controller 32 as a control device that is responsible for controlling the vehicle air-conditioning apparatus 1. The air-conditioning controller 32 is connected via a vehicle communication bus to a vehicle controller 35 (an ECU) that is responsible for overall vehicle control including drive control over the motor unit 65 and charge/discharge control over the battery 55, and transmits and receives information. A microcomputer as an example of a computer including a processor can be applied to each of the air-conditioning controller 32 and the vehicle controller 35 (the ECU).

The following sensors and detectors are connected to the air-conditioning controller 32 (the control device), and outputs of these sensors, detectors, and the like are inputted into the air-conditioning controller 32. In other words, the air-conditioning controller 32 (the control device) is connected to an outside air temperature sensor 33 that detects the temperature (Tam) of the air outside the vehicle, an HVAC suction temperature sensor 36 that detects the temperature of the air to be sucked into the air circulation path 3 from the inlet 25, an inside air temperature sensor 37 that detects the temperature of the air inside the vehicle (inside air), an outlet temperature sensor 41 that detects the temperature of the air to be blown into the vehicle interior from an outlet 29, a discharge pressure sensor 42 that detects the refrigerant discharge pressure (a discharge pressure Pd) of the compressor 2, a discharge temperature sensor 43 that detects the refrigerant discharge temperature of the compressor 2, a suction temperature sensor 44 that detects a refrigerant suction temperature TS of the compressor 2, a radiator temperature sensor 46 that detects the temperature of the radiator 4 (the temperature of the refrigerant that has passed through the radiator 4, or the temperature of the radiator 4 itself: a radiator temperature TCI), and a radiator pressure sensor 47 that detects the pressure of the refrigerant of the radiator 4 (the pressure of the refrigerant in the radiator 4, or the pressure of the refrigerant immediately after exiting from the radiator 4: a radiator pressure PCI), a heat sink temperature sensor 48 that detects the temperature of the heat sink 9 (the temperature of the air that has passed through the heat sink 9, or the temperature of the heat sink 9 itself: a heat sink temperature Te), a heat sink pressure sensor 49 that detects the refrigerant pressure of the heat sink 9 (the pressure of the refrigerant in the heat sink 9, or the pressure of the refrigerant immediately after exiting from the heat sink 9), a sun sensor 51 of, for example, a photosensor type for detecting the amount of solar radiation to the vehicle interior, a vehicle speed sensor 52 for detecting the travel speed of the vehicle (a vehicle speed), an air-conditioning operating unit 53 for setting the switching of a set temperature and air-conditioning operation, an outdoor heat exchanger temperature sensor 54 that detects the temperature of the outdoor heat exchanger 7 (in the embodiment, a refrigerant discharge temperature TXO immediately after the discharge from the outdoor heat exchanger 7), and an outdoor heat exchanger pressure sensor 56 that detects the refrigerant pressure of the outdoor heat exchanger 7 (in the embodiment, a refrigerant discharge pressure value PXO immediately after the discharge from the outdoor heat exchanger 7).

In addition to the above sensors and unit, the air-conditioning controller 32 is also connected to a battery temperature sensor 76 that detects the temperature of the battery 55 (any of the temperature of the battery 55 itself, the temperature of the heating medium that has exited from the battery 55, and the temperature of the heating medium that enters the battery 55: a battery temperature Tb), a heating medium outlet temperature sensor that detects the temperature of the heating medium that has exited from the heating medium flow path of the chiller heat exchanger 64, and a motor temperature sensor 78 that detects the temperature of the motor unit 65 (any of the temperature of the motor unit 65 itself, the temperature of the heating medium that has exited from the motor unit 65, and the temperature of the heating medium that enters the motor unit 65: a motor temperature Tw).

On the other hand, the output side of the air-conditioning controller 32 is connected to the compressor 2, the outdoor fan, the indoor fan (blower fan) 27, the intake switching damper 26, the air mixing damper 28, an outlet switching damper 31, the outdoor expansion valve 6, the indoor expansion valve 8, the solenoid valves including the solenoid valves 21 and 22, the auxiliary heater 23, the first and second circulation pumps 62 and 63, the auxiliary expansion valve 73, and the three-way valve 81. The air-conditioning controller 32 is configured in such a manner as to control these components on the basis of the output of each sensor, settings inputted by the air-conditioning operating unit 53, and information from the vehicle controller 35.

The operation of the vehicle air-conditioning apparatus 1 configured in this manner, particularly, operation during the heating operation is described below. In the heating operation, the air-conditioning controller 32 (the control device) according to the embodiment can switch between three modes: an outside air heat absorption heating mode in which only the outdoor heat exchanger 7 absorbs heat (a heating mode), a combined heating mode in which the outdoor heat exchanger 7 and the chiller heat exchanger 64 absorb heat (a waste heat recovery parallel mode), and a temperature control target heat absorption heating mode in which only the chiller heat exchanger 64 absorbs heat (a waste heat recovery single mode), and executes the mode.

Each heating mode is described below.

(1) Outside Air Heat Absorption Heating Mode (Heating Mode)

Figure 3:
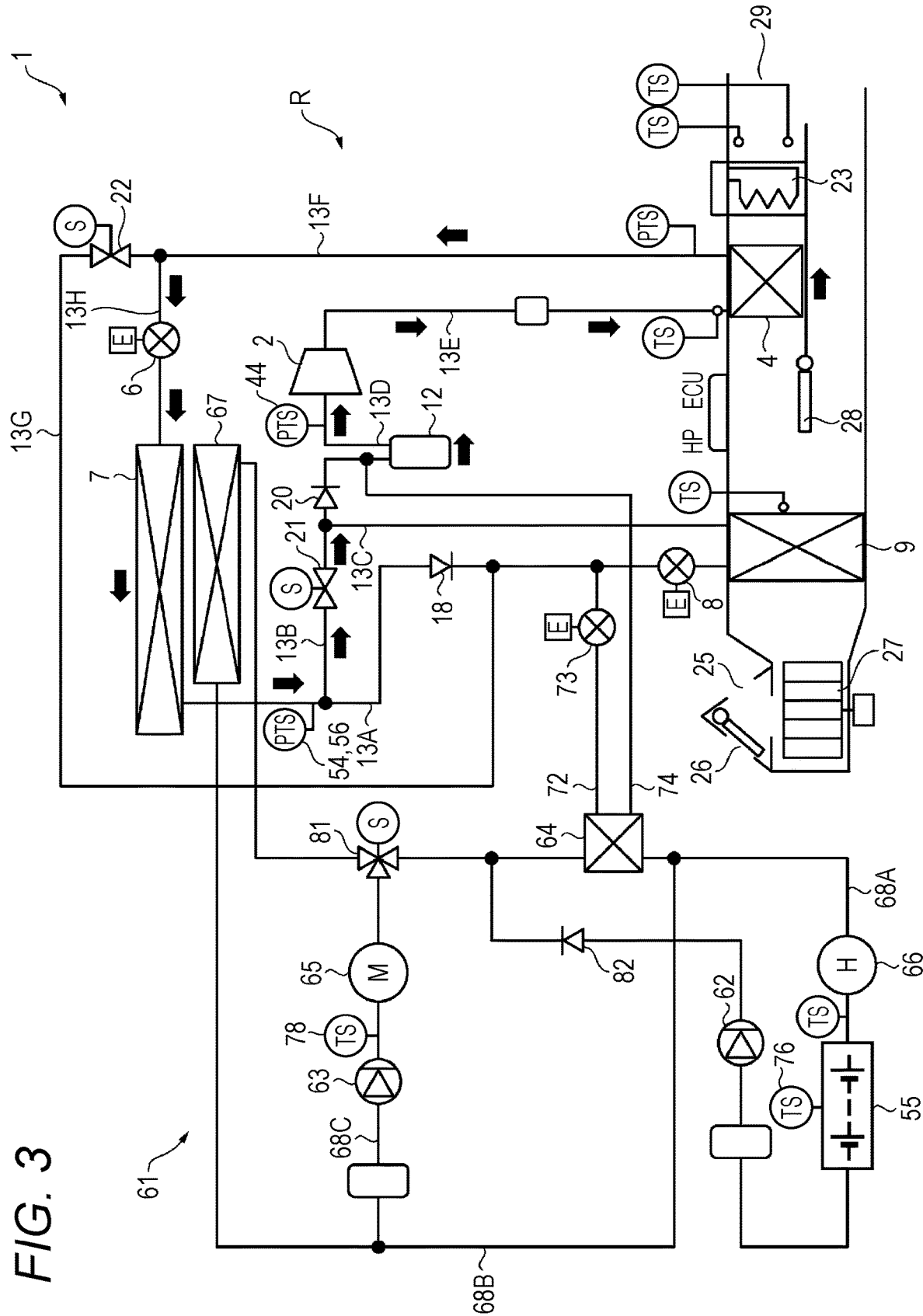
FIG. 3 is an explanatory diagram illustrating the flow of a refrigerant during heating operation in an outside air heat absorption heating mode in the vehicle air-conditioning apparatus according apparatus to the embodiment of the present invention.

FIG. 3 illustrates the flow (solid arrows) of the refrigerant in the refrigerant circuit R in the outside air heat absorption heating mode. When the heating operation is selected by the air-conditioning controller 32 (an auto mode), or by a manual operation on the air-conditioning operating unit 53 (a manual mode), and the air-conditioning controller 32 executes the outside air heat absorption heating mode, the solenoid valve 21 (for heating) is opened and the indoor expansion valve 8 is fully closed. Moreover, the auxiliary expansion valve 73 is fully closed, and the solenoid valve 22 (for dehumidification) is also closed.

The compressor 2 and the fan 27 are operated, and the air mixing damper 28 is enabled to adjust the ratio of the air blown out from the indoor fan 27 to be let into the radiator 4 and the auxiliary heater 23. Consequently, the high-temperature, high-pressure gas refrigerant discharged from the compressor 2 flows into the radiator 4. Since the air in the air circulation path 3 is let into the radiator 4, the air in the air circulation path 3 is heated by the high-temperature refrigerant in the radiator 4, whereas the refrigerant in the radiator 4 loses heat due to the air, is cooled, condensed, and liquefied.

The refrigerant liquefied in the radiator 4 exits from the radiator 4, and then reaches the outdoor expansion valve 6 through the refrigerant pipes 13F and 13H. The refrigerant is decompressed by the outdoor expansion valve 6 and then flows into the outdoor heat exchanger 7. The refrigerant that has flowed into the outdoor heat exchanger 7 evaporates and pumps (absorbs) heat from the outside air that flows in while driving, or from the outside air that is let in by the outdoor fan (not illustrated). In other words, the refrigerant circuit R serves as a heat pump.

The low-temperature refrigerant that has exited from the outdoor heat exchanger 7 flows into the accumulator 12 through the refrigerant pipe 13A, the refrigerant pipe 13B, the solenoid valve 21, and the check valve 20. After the refrigerant is separated into gas and liquid in the accumulator 12, the gas refrigerant is sucked into the compressor 2 through the refrigerant pipe 13D. This circulation is repeated. The air heated in the radiator 4 is blown out through the outlet 29. Consequently, the vehicle interior is heated.

The air-conditioning controller 32 calculates a target radiator pressure PCO (a target value of the pressure PCI of the radiator 4) from a target heater temperature TCO (a target value of the temperature of the air on a leeward side of the radiator 4) calculated from a target outlet temperature TAO, controls the number of revolutions of the compressor 2 on the basis of the target radiator pressure PCO, and the refrigerant pressure of the radiator 4 (the radiator pressure PCI. A high pressure in the refrigerant circuit R) detected by the radiator pressure sensor 47, and controls the valve opening position of the outdoor expansion valve 6 on the basis of the temperature of the radiator 4 (the radiator temperature TCI) detected by the radiator temperature sensor 46 and the radiator pressure PCI detected by the radiator pressure sensor 47 to control the subcooling degree of the refrigerant at the outlet of the radiator 4. The target heater temperature TCO is basically TCO=TAO. However, a given restriction is placed on the control. Moreover, if the heating capacity based on the radiator 4 is insufficient, the auxiliary heater 23 is energized to generate heat, thereby assisting (complementing) the heating capacity.

(2) Combined Heating Mode (Waste Heat Recovery Parallel Mode)

Figure 4:
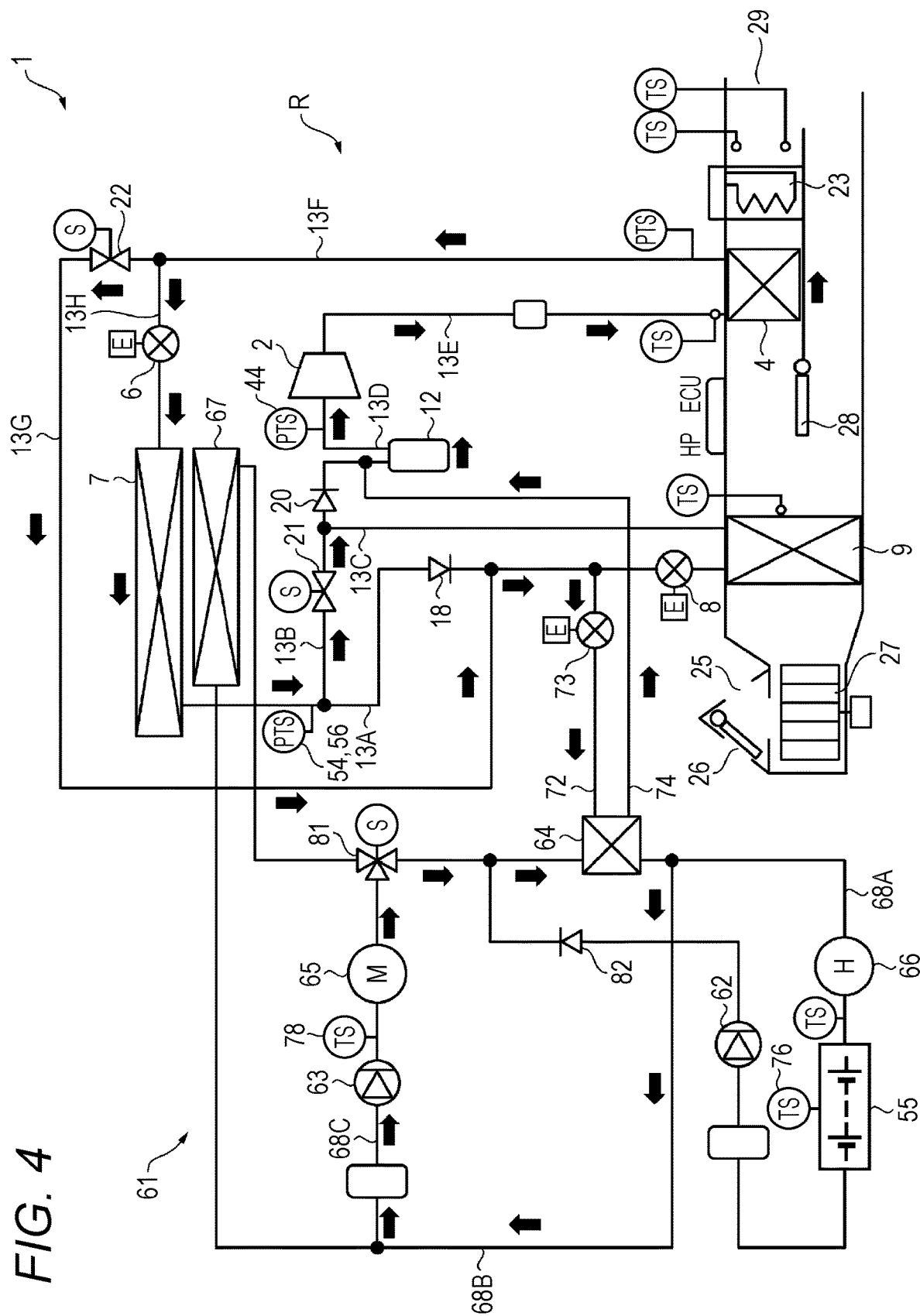
FIG. 4 is an explanatory diagram illustrating the flow of the refrigerant during heating operation in a combined heating mode in the vehicle air-conditioning apparatus according to the embodiment of the present invention.

FIG. 4 illustrates the flows of the refrigerant in the refrigerant circuit R and the flow of the heating medium in the device temperature adjustment circuit 61 in the combined heating mode. In the combined heating mode, the air-conditioning controller 32 also opens the solenoid valve 22 and the auxiliary expansion valve 73 to enable control of their valve opening positions in the refrigerant circuit R illustrated in FIG. 3 in the outside air heat absorption heating mode in the heating operation. Consequently, a part of the refrigerant that has exited from the radiator 4 is branched on the refrigerant upstream side of the outdoor expansion valve 6, and flows into the refrigerant pipe 13A through the refrigerant pipe 13G.

The refrigerant that has flowed into the refrigerant pipe 13A enters the branch pipe 72, is decompressed by the auxiliary expansion valve 73, then flows into the refrigerant flow path of the chiller heat exchanger 64 through the branch pipe 72, and evaporates. At this point in time, the endothermic effect is exerted. The refrigerant that has evaporated in the refrigerant flow path enters the downstream side of the check valve 20 of the refrigerant pipe 13B through the refrigerant pipe 74, and is sucked into the compressor 2 through the accumulator 12 and the refrigerant pipe 13D. This circulation is repeated.

On the other hand, as illustrated in FIG. 4, the heating medium in the device temperature adjustment circuit 61 is discharged from the second circulation pump 63 to a heating medium pipe 68C, reaches the motor unit 65, exchanges heat with the motor unit 65, and then reaches the heating medium flow path of the chiller heat exchanger 64 through the three-way valve 81. The refrigerant evaporating in the refrigerant flow path of the chiller heat exchanger 64 absorbs heat from the heating medium to cool the heating medium. The heating medium that has been cooled by the endothermic effect of the refrigerant exits from the chiller heat exchanger 64, and is sucked into the second circulation pump 63. This circulation is repeated.

In this manner, in the combined heating mode, the outdoor heat exchanger 7 and the chiller heat exchanger 64 are connected in parallel to the flow of the refrigerant in the refrigerant circuit R; therefore, the refrigerant flows into the outdoor heat exchanger 7 and the chiller heat exchanger 64 and evaporates in each of them. Therefore, the outdoor heat exchanger 7 absorbs heat from the outside air, and the chiller heat exchanger 64 also absorbs heat from the heating medium (the motor unit 65). Consequently, heat is pumped from the motor unit 65 (the temperature control target) through the heating medium, and the pumped heat is transferred to the radiator 4 while the motor unit 65 is cooled; therefore, the heat can be used to heat the vehicle interior.

(3) Temperature Control Target Heat Absorption Heating Mode (Waste Heat Recovery Single Mode)

Figure 5:
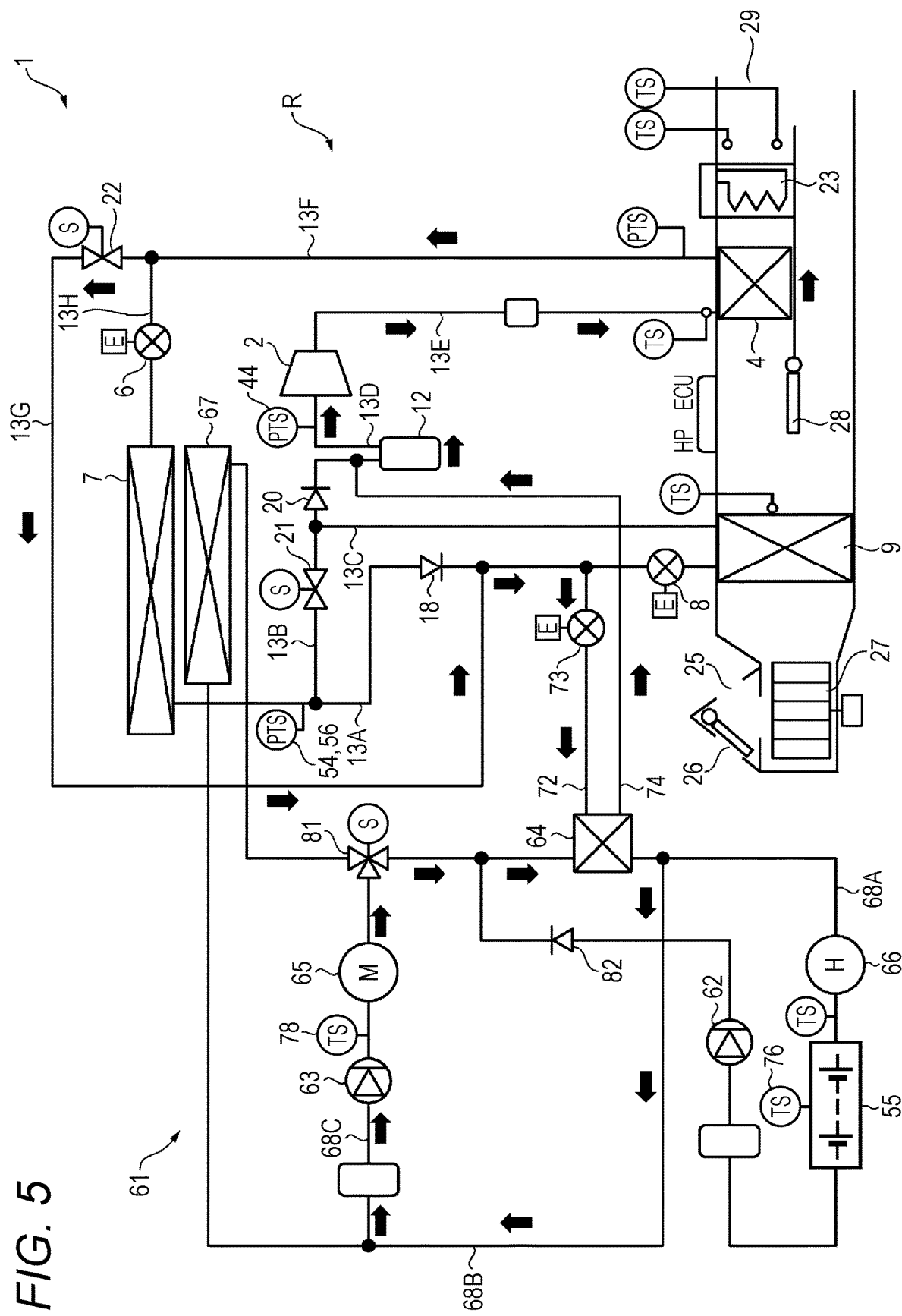
FIG. 5 is an explanatory diagram illustrating the flow of the refrigerant during heating operation in a temperature control target heat absorption heating mode in the vehicle air-conditioning apparatus according to the embodiment of the present invention.

FIG. 5 illustrates the flow of the refrigerant in the refrigerant circuit R and the flow of the heating medium in the device temperature adjustment circuit 61 in the temperature control target heat absorption heating mode.

In the temperature control target heating mode, the air-conditioning controller 32 closes the solenoid valve 21 (which may be open since there is the check valve 20) and fully closes the outdoor expansion valve 6 and the indoor expansion valve 8, and opens the solenoid valve 22 and also opens the auxiliary expansion valve 73 to enable control of their valve opening positions. The compressor 2 and the indoor fan 27 are operated (the heating medium heater 66 is not energized).

Consequently, all the refrigerant that has exited from the radiator 4 flows into the solenoid valve 22, and flows into the refrigerant pipe 13A through the refrigerant pipe 13G. Next, the refrigerant enters the branch pipe 72, is decompressed by the auxiliary expansion valve 73, and then flows into the refrigerant flow path of the chiller heat exchanger 64 through the branch pipe 72 to evaporate. At this point in time, the endothermic effect is exerted. The refrigerant that has evaporated in the refrigerant flow path flows into the downstream side of the check valve 20 of the refrigerant pipe 13B through the refrigerant pipe 74, and is sucked into the compressor 2 through the accumulator 12 and the refrigerant pipe 13D. This circulation is repeated.

On the other hand, as illustrated in FIG. 5, the heating medium in the device temperature adjustment circuit 61 is discharged from the second circulation pump 63 to the heating medium pipe 68C, reaches the motor unit 65, exchanges heat with the motor unit 65, and then reaches the heating medium flow path of the chiller heat exchanger 64 through the three-way valve 81. The refrigerant evaporating in the refrigerant flow path of the chiller heat exchanger 64 absorbs heat from the heating medium to cool the heating medium. The heating medium that has been cooled by the endothermic effect of the refrigerant exits from the chiller heat exchanger 64, and is sucked into the second circulation pump 63. This circulation is repeated.

In this manner, in the waste heat recovery single mode, the refrigerant in the refrigerant circuit R evaporates in the chiller heat exchanger 64, and heat is absorbed only from the heating medium in the device temperature adjustment circuit 61. In other words, the refrigerant does not flow into the outdoor heat exchanger 7 and does not evaporate therein, and the refrigerant pumps heat only from the motor unit 65 through the heating medium. Therefore, while a problem of frost formed on the outdoor heat exchanger 7 is solved, the motor unit 65 is cooled, and the heat pumped from the motor unit 65 (the temperature control target) is transferred to the radiator 4. As a result, the vehicle interior can be heated.

(4) Mode Switching During Heating Operation

The air-conditioning controller 32 switches between the heating modes, for example, in the following cases:

When the vehicle air-conditioning apparatus 1 is operating in the normal heating mode, if a sufficient amount of waste heat can be recovered from the motor unit 65 (the temperature Tw of the heating medium (cooling water) entering the motor unit 65>30 deg, and waste heat recovery requested), the normal heating mode is transitioned to the waste heat recovery parallel mode.

If the waste heat cannot be recovered (Tw<−5 deg, or Tw<temperature Tam of the air outside the vehicle, or no waste heat recovery request) while the vehicle air-conditioning apparatus 1 is being operated in the waste heat recovery parallel mode, the air-conditioning controller 32 judges that the waste heat recovery is complete, and switches from the waste heat recovery parallel mode to the normal heating mode.

If the water temperature continues to increase (Tw>60 deg and the waste heat recovery requested) while the vehicle air-conditioning apparatus 1 is being operated in the waste heat recovery parallel mode, the waste heat recovery parallel mode is transitioned to the waste heat recovery single mode.

During the operation in the waste heat recovery parallel mode, the refrigerant or oil contained in the refrigerant may accumulate in the outdoor heat exchanger 7 depending on the operating status. If a fixed amount or greater of, for example, the refrigerant accumulates in the outdoor heat exchanger, the amount of the refrigerant that circulates in the refrigerant circuit R becomes insufficient, which may lead to, for example, a reduction in heating performance, a reduction in durability and failure of the compressor, and false detection of refrigerant shortage.

Accordingly, during the heating operation in the waste heat recovery parallel mode, the air-conditioning controller 32 determines an operating status that is a state in which the refrigerant can accumulate in the outdoor heat exchanger, and switches to the waste heat recovery single mode to execute the heating operation.

As the state in which the refrigerant can accumulate in the outdoor heat exchanger during the heating operation in the waste heat recovery parallel mode, there is an operating state in which a state in which the refrigerant discharge pressure value PXO of the outdoor heat exchanger is less than a refrigerant suction pressure value PS of the compressor continues for a fixed period of time or longer.

When the compressor is operating at a given number of revolutions or less, or when the compressor is operating intermittently, the amount of the refrigerant circulating in the refrigerant circuit R decreases, and the refrigerant discharge pressure value PXO of the outdoor heat exchanger 7 decreases as compared to the refrigerant suction pressure value PS of the compressor 2, which results in the state in which the refrigerant can accumulate in the outdoor heat exchanger 7.

Moreover, also when a state in which the heat absorption amount of the refrigerant in the chiller heat exchanger 64 is greater than the heat absorption amount of the refrigerant in the outdoor heat exchanger 7 continues for a fixed period of time or longer, the refrigerant discharge pressure value PXO of the outdoor heat exchanger 7 decreases as compared to the refrigerant suction pressure value PS of the compressor 2, which results in the state in which the refrigerant can accumulate in the outdoor heat exchanger 7.

Therefore, the air-conditioning controller 32 monitors the refrigerant discharge pressure value PXO of the outdoor heat exchanger 7 and the refrigerant suction pressure value PS of the compressor 2. The refrigerant discharge pressure value PXO obtained from the outdoor heat exchanger pressure sensor 56 can be used as the refrigerant discharge pressure value PXO, and the refrigerant suction pressure value PS calculated from the refrigerant suction temperature TS obtained from the suction temperature sensor 44 and a refrigerant saturation temperature can be used as the refrigerant suction pressure value PS.

If the state in which the refrigerant discharge pressure value PXO of the outdoor heat exchanger 7 is less than the refrigerant suction pressure value PS of the compressor 2, or a state in which the refrigerant discharge temperature TXO of the outdoor heat exchanger 7 is less than the refrigerant suction temperature TS of the compressor 2, continues for more than a predetermined period of time, the air-conditioning controller 32 switches from the waste heat recovery parallel mode to the waste heat recovery single mode to execute the heating operation.

Note that the refrigerant discharge pressure value PXO may be calculated by use of the refrigerant discharge temperature TXO obtained from the outdoor heat exchanger temperature sensor 54 and the refrigerant saturation temperature, or a pressure sensor may be provided at the inlet of the compressor 2 to detect the refrigerant suction pressure value PS directly.

In addition, the air-conditioning controller 32 may monitor the refrigerant discharge temperature TXO of the outdoor heat exchanger 7 and the refrigerant suction temperature TS of the compressor 2. In this case, the refrigerant discharge temperature TXO can be calculated by use of the refrigerant discharge pressure value PXO detected by the outdoor heat exchanger pressure sensor 56 and the saturation temperature, and can also use the refrigerant discharge temperature TXO detected directly by the outdoor heat exchanger temperature sensor 54. Moreover, the refrigerant suction temperature TS can be calculated by use of the refrigerant suction pressure value PS detected directly by a pressure sensor provided at the inlet of the compressor 2 and the saturation temperature, and can also use the refrigerant suction temperature TS detected directly by the suction temperature sensor 44.

Moreover, for example, the air-conditioning controller 32 monitors an operating status such as the number of revolutions of the compressor 2 and, if the compressor is operating at a given number of revolutions or less, or if the compressor is operating intermittently, can switch from the waste heat recovery parallel mode to the waste heat recovery single mode and execute the heating operation.

The vehicle air-conditioning apparatus 1 according to the embodiment switches from the waste heat recovery parallel mode to the waste heat recovery single mode to execute the heating operation when the operating status during the heating operation is the state in which the refrigerant can accumulate in the outdoor heat exchanger 7. In this manner, it is possible to avoid the state in which the refrigerant can accumulate in the outdoor heat exchanger 7 by temporarily stopping the circulation of the refrigerant to the outdoor heat exchanger 7. Furthermore, in the meantime, the refrigerant discharge pressure value PXO of the outdoor heat exchanger 7 and the refrigerant suction pressure value PS of the compressor 2 can be recovered to their desired states. Consequently, it is possible to prevent, for example, a reduction in heating performance, a reduction in durability and failure of the compressor, and false detection of refrigerant shortage.

Up to this point the embodiments of the present invention have been described in detail with reference to the drawings. However, the specific configuration is not limited to these embodiments, and, for example, modifications to the design within the scope that does not depart from the gist of the present invention are also included in the present invention.

LIST OF REFERENCE SIGNS

1 Vehicle air-conditioning apparatus
2 Compressor
4 Radiator
6 Outdoor expansion valve
7 Outdoor heat exchanger
8 Indoor expansion valve
9 Heat sink
32 Air-conditioning controller (control device)
44 Suction temperature sensor
54 Outdoor heat exchanger temperature sensor
56 Outdoor heat exchanger pressure sensor
61 Device temperature adjustment circuit
63 Second circulation pump
64 Chiller heat exchanger (refrigerant-heating medium heat exchanger)
65 Motor unit

What is claimed is:

1. A vehicle air-conditioning apparatus comprising:
a refrigerant circuit including a compressor configured to compress a refrigerant, a heating unit configured to heat blowing air to be blown into an air-conditioning target space, and an outdoor heat exchanger configured to cause the refrigerant to absorb heat;
a device temperature adjustment circuit including a temperature control target-specific heat exchanger configured to adjust, by use of the refrigerant, the temperature of a temperature control target mounted on a vehicle; and
a control device configured to control the refrigerant circuit and the device temperature adjustment circuit, wherein
in a heating operation for heating the interior of the vehicle by use of the heating unit, the control device is programmed to perform:
a temperature control target heat absorption heating mode in which the refrigerant that has been discharged from the compressor and has dissipated heat in the heating unit absorbs heat in the temperature control target-specific heat exchanger, and
a combined heating mode in which the refrigerant that has been discharged from the compressor and has dissipated heat in the heating unit absorbs heat in the outdoor heat exchanger and the temperature control target-specific heat exchanger, and
during the heating operation in the combined heating mode, the control device is programmed to determine an operating state that allows the refrigerant to accumulate in the outdoor heat exchanger, and switch to the temperature control target heat absorption heating mode to execute the heating operation.

2. The vehicle air-conditioning apparatus according to claim 1, wherein upon a state in which a refrigerant discharge pressure value of the outdoor heat exchanger is less than a refrigerant suction pressure value of the compressor continuing for a given period of time or longer, the control device determines to be in the operating state that allows the refrigerant to accumulate in the outdoor heat exchanger, and switches from the combined heating mode to the temperature control target heat absorption heating mode to execute the heating operation.

3. The vehicle air-conditioning apparatus according to claim 2, wherein the refrigerant discharge pressure value is a value calculated based on a refrigerant discharge temperature of the outdoor heat exchanger and a refrigerant saturation temperature.

4. The vehicle air-conditioning apparatus according to claim 2, wherein the refrigerant suction pressure value is a value calculated based on a refrigerant suction temperature of the compressor and the refrigerant saturation temperature.

5. The vehicle air-conditioning apparatus according to claim 1, wherein upon a state in which a refrigerant discharge temperature of the outdoor heat exchanger is less than a refrigerant suction temperature of the compressor continuing for a given period of time or longer, the control device determines to be in the operating state that allows the refrigerant to accumulate in the outdoor heat exchanger, and switches from the combined heating mode to the temperature control target heat absorption heating mode to execute the heating operation.

6. The vehicle air-conditioning apparatus according to claim 5, wherein the refrigerant discharge temperature is a value calculated based on a refrigerant discharge pressure value of the outdoor heat exchanger and a refrigerant saturation temperature.

7. The vehicle air-conditioning apparatus according to claim 5, wherein the refrigerant suction temperature is a value calculated based on a refrigerant suction pressure value of the compressor and the refrigerant saturation temperature.

8. The vehicle air-conditioner according to claim 1, wherein upon the compressor being operating at a given number of revolutions or less, or upon the compressor being operating intermittently, the control device determines to be in the operating state that allows the refrigerant to accumulate in the outdoor heat exchanger, and switches from the combined heating mode to the temperature control target heat absorption heating mode to execute the heating operation.

* * * * *